United States Patent [19]

Matsuguchi et al.

[11] Patent Number: 4,826,213
[45] Date of Patent: May 2, 1989

[54] ADHESIVE MATERIAL FOR PREVENTING REUSE

[75] Inventors: Tadashi Matsuguchi, Suita; Noboru Matsuguchi, Ashiya, both of Japan

[73] Assignee: Daimatsu Kagaku Kogyo Co., Ltd., Osaka, Japan

[21] Appl. No.: 158,744

[22] Filed: Feb. 22, 1988

Related U.S. Application Data

[62] Division of Ser. No. 780,286, Sep. 26, 1985, Pat. No. 4,763,931.

[30] Foreign Application Priority Data

Oct. 1, 1984 [JP] Japan ................... 59-206768
Feb. 15, 1985 [JP] Japan ................... 60-028542
Feb. 15, 1985 [JP] Japan ................... 60-028543
Mar. 29, 1985 [JP] Japan ................... 60-067381

[51] Int. Cl.⁴ ................................. B42D 15/00
[52] U.S. Cl. ................................. 283/108; 253/81; 428/916
[58] Field of Search ................ 283/1, 81, 108; 428/214, 916

[56] References Cited

U.S. PATENT DOCUMENTS 3,854,581 12/1974 Jones, Jr. ................... 283/81 X
4,082,873 4/1978 Williams ................... 283/108 X
4,121,003 10/1978 Williams ................... 283/81 X
4,184,701 1/1980 Franklin et al. ........... 283/108 X
4,345,393 8/1982 Price ......................... 283/81 X
4,608,288 8/1986 Spindler ................... 283/108 X

FOREIGN PATENT DOCUMENTS 2613131 10/1977 Fed. Rep. of Germany ...... 283/108
52-73698 1/1977 Japan ................................. 283/108
957589 5/1964 United Kingdom .............. 428/916

Primary Examiner—Paul A. Bell
Attorney, Agent, or Firm—Birch, Stewart, Kolasch & Birch

[57] ABSTRACT

An adhesive material which protects against reused which comprises a released sheet (12), an adhesive layer (14) laminated on one main surface of said release sheet (12), a second layer (16) which can be cut or torn by fingers and laminated on said adhesive layer (14), an adhesive layer (18) laminated on said second layer (16), and a first layer (20) laminated and adhered temporarily on said adhesive layer (18).

According to the present invention, the first and second layers are adhered temporarily by the adhesion layer in such a state that re-adhering is hardly possible. Thus when attempting to tear off the adhering material, the first layer is separated from the second layer and re-adhering is impossible.

28 Claims, 7 Drawing Sheets

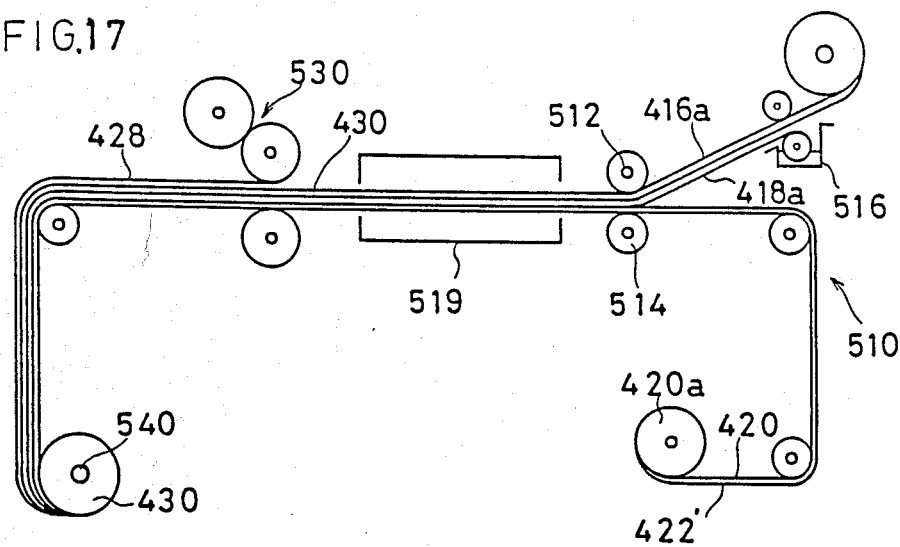
FIG. 17
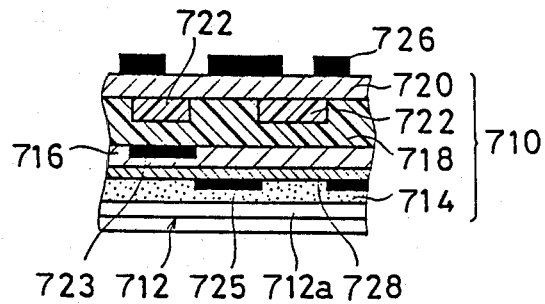
FIG. 18
FIG. 19a  FIG. 19b  FIG. 19c
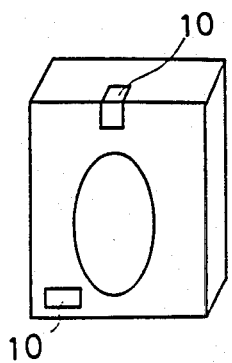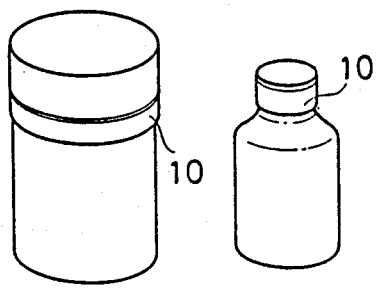

ADHESIVE MATERIAL FOR PREVENTING REUSE

This application is a divisional of copending application Ser. No. 780,286, filed on Sept. 26, 1985 now U.S. Pat. No. 4,763,931.

BACKGROUND OF THE INVENTION

1. Field of the Invention

The present invention relates to an adhesive material for preventing reuse, more specifically, to an adhesive material which prevents reuse, for example, as a price tag or a label or the like adhered on the opening of the package.

2. Description of the Prior Art

Conventionally, labels for preventing re-adhering used as price tags or the like have been known wherein suitable sewing stitches or cuts are provided on the base surface material, so that when any attempt is made, for example, in the shop to tear off the label and replace it with another price tag, the label will separate and tear on the stitches or cuts, and such attempt can be distinguished at a glance.

Labels adhered on the opening of a package for indicating a sealed state can be easily removed on the spot, for example, by picking up goods displayed on the show shelves in the shop, depending on the material of the package opening and the surface treatment thereof, and re-adhered after adding foreign objects into the package without noticing that the label was removed, and it is difficult to tell whether the package was opened or not just by looking at the label externally. Therefore, there is a possibility that the contents of the package will be touched, for example, and toxic substances added thereto.

Accordingly, recently labels sensitive to the separation after the adhesion have been introduced in the market.

The label comprises a film, and a silicon layer having a vaporized metal layer on the surface formed partly on the reverse side thereof. Thus, a part of the vaporized metal layer is interposed by the silicon layer and is not vaporized on the film directly. In addition, on the surface of the vaporized metal layer, a pressure sensitive adhesive layer is formed and a release sheet is adhered temporarily thereon.

The label is applied to the opening of the package by pressing the exposed surface of the adhesive layer after removing the peeling sheet. Then, when the label adhered on the opening is torn off, only the part of the vaporized metal layer which was not metallized directly onto the film due to the silicon layer, remains as adhering on the opening by the adhesive layer. Meanwhile, when the opening is unsealed, the vaporized metal layer adhered and remained thereon will be cut or torn, thereby the unsealed state can be distinguished.

SUMMARY OF THE INVENTION

However, such labels have the disadvantage of being high in cost, because the film, as the material on to which the metal is being vaporized, is limited to polyester or the like and other various conditions must be satisfied, as the metal is vaporized on to the film and the silicon layer. Moreover, there were further disadvantages such as sanitary problems caused by the attachment of dust on the tacky surface of the exposed adhesive layer, due to a part of the adhesive layer remaining on the adhering portion of the material being adhered on, when the film was torn off.

Therefore, a principal object of the present invention is to provide an adhering material for preventing reuse, which is sensitive to the separation after the adhesion and does not require any vaporizing process.

The present invention is, to be brief, an adhering material for preventing reuse comprising an adhesive layer, a second layer, which can be cut or torn by fingers and laminated on the adhesive layer, an adhesion layer laminated on the second layer and a first layer laminated and adhered temporarily to the adhesion layer.

According to the present invention, the second layer is adhered temporarily to the first layer by the adhesion layer, thus it can be formed without vaporization as in the past. In addition, since the first and second layers are adhered temporarily, whereby re-adhering is impossible by the adhesive layer, when any attempt is made to tear the adhering material off from the opening of the package and so on, the first layer will come off from the second layer and the re-adhering thereof is no longer possible, thus it is clear that the adhering material that had been adhered on is torn off. Furthermore, when the second layer has been cut or torn, it will not return to its original state, so that the separation of the first layer can be distinguished. Thus, separation of the adhering material that had been adhered on can be seen at a glance, and the adhering material without the vaporization process used hitherto, may be obtained.

These objects and other objects, features, aspects and advantages of the present invention will become more apparent from the following detailed description of the embodiment when taken in connection with the accompanying drawings.

It is to be understood that like parts are designated by like reference numerals throughout the accompanying drawings.

BRIEF DESCRIPTION OF THE DRAWINGS

FIG. 17 is an illustrated view showing another example of the apparatus for producing a base material used in the embodiment in accordance with the present invention.

FIG. 18 is a cross-sectional view of a separate embodiment.

FIGS. 19(a), (b) and (c) are perspective views showing applications of said embodiment.

DESCRIPTION OF THE PREFERRED EMBODIMENTS

Figure 1:
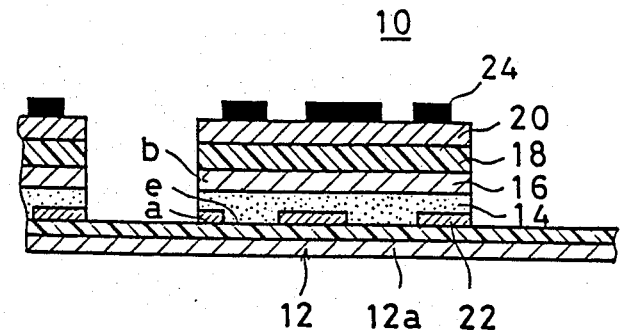
FIG. 1 is a cross-sectional view of a label constituting one embodiment in accordance with the present invention.

FIG. 1 is a cross-sectional view of a label constituting one embodiment in accordance with the present invention.

The label 10 is attached temporarily on a release sheet 12 and formed by an adhesive layer 14, a second layer 16, an adhesion layer 18 and a first layer 20 laminated successively, wherein an adhesive power reducing layer 22 for reducing the adhesive power of the adhesive layer 14, is laminated on the part of said adhesive layer 14, and a printed layer 24 is formed on the first layer 20.

The adhesive layer 14 is for providing the adhesive power to the label 10 and coated for example, with adhesives such as a pressure sensitive adhesives and so on, and formed on one main surface of the second layer 16, on the surface thereof, the release sheet 12 is adhered temporarily for protecting the adhesive layer 14.

As the second layer 16, a sheet having a breakable property possible of breaking easily by hands, such as an aluminum foil or a synthetic resin film represented by a brittle film, made by mixing filler pigment (e.g. titanium white and calcium carbonate) with copolymerized resins of vinyl chloride and acrylic.

Among those suitable, are ones which have a relatively flexible property so as not to be separated by the first layer 20 restoring to the original state against the adhesive power of the adhesion layer 18, when the label 10 is bent and adhered on the bent portion.

The first layer 20 is formed to protect the second layer 16 from cutting and tearing, and is adhered temporarily on the second layer 16 via the adhesion layer 18.

Meanwhile, as the first layer 20, for example, polyester and a nylon film having firmness in comparison and which are difficult to shrink by the heat, paper or synthetic paper are suitable. But as to be described later, for the capability of seeing the separated traces from the surface side of the first layer 20 when the label is torn off, it is preferable to select transparent or semi-transparent materials. Then it can be easily seen that a part of second layer 16 remains on the material being adhered, and a part is torn off therefrom and adhered on first layer 20, this is more in accordance with the purpose of using the labels.

The adhesion layer 18 is for adhering the first layer 20 and the second layer 16 temporarily in a state, whereby re-adhering is impossible, and consists of a paraffinic agent, for example, paraffin and wax and is formed between the first and second layers 20 and 16. Meanwhile, the adhesive power of adhesion layer 18 which is between the second and first layers 20 and 16, is weaker than that of the adhesive layer 14.

The adhesive power reducing layer 22 is formed by pattern coating a varnish on the surface of said adhesive layer 14, and its purpose is for inactivating the pressure sensitive adhesives such as the adhesives, forming the adhesive layer 14.

That is, the adhesive power of the adhesive layer 14 differs considerably between the portions where the adhesive power reducing layer 22 is formed and where it is not formed. As to be described later, it is formed in such a manner that in the portions of the adhesive layer 14 at the portions where it is adhered to the material being adhered on and contacting thereon as it is even when the first layer 20 is torn off by hands thereafter, the adhesion is so strong that it will not come off easily. But at the positions where the adhesive power reducing layer 22 is formed, it can be torn off relatively easy from the material being stuck.

The adhesive power reducing layer 22 is not only suitably formed by pattern coating the varnish and so on as aforementioned, but may also be formed by pattern coating the other vegetable and mineral powders which inactivate the adhesives, examples of such powders are synthetic resins, ink such as UV ink and oxidation polymerization type ink, flour, starch, talc and so on.

If the adhesive power reducing layer 22 is formed in such a way that by pattern printing and coating the picture lines of letters and pictures, for example, "unsealed", when the first layer 20 is torn off and the second layer 16 is torn, the pattern such as the letter "unsealed" mentioned above will appear as to be described later. This is more in accordance with the purpose of using the label 10.

In the meantime, the label 10 is formed so as to satisfy the equations $a < e < c$, $b < d$ ($c \leq b$ or $c \leq b$). When an adhesive power of the adhesive layer 14 at the position of adhesive power reducing layer 22 is denoted as a, a force required to tear the second layer 16 is represented by b, a force required to tear off the second layer 16 from the first layer 20 at the adhesion layer 18 is given by c, an adhesive power of the adhesive layer 14 outside the positions of adhesive power reducing layer 22 is designated as d and a force required to separate the release sheet 12 from the adhesive layer is denoted as e.

For applying the label 10, the release sheet 12 must be removed first, and the label is stuck as the price tag, or on the openings of the cake packages as shown in FIGS. 19(a), (b) and (c).

In order to unseal the opening of the package with the label 10 having been adhered to sealing the opening, wherein, the label 10 must be removed before opening the sealed portion.

Figure 2:
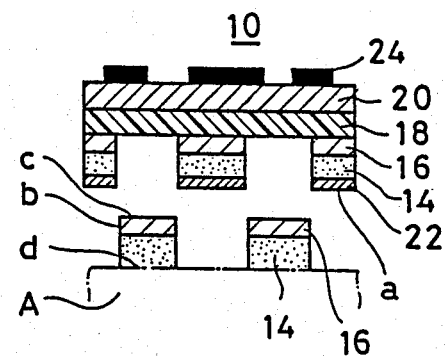
FIG. 2 is a cross-sectional view showing a broken state of said embodiment.

In this case, the first layer 20 is adhered to the second layer 16 temporarily by the adhesion layer 18, and second layer 16 is attached firmly to the material A being adhered to by the adhesive layer 14, and at the position where the adhesive power reducing layer 22 is formed, the adhesion is weaker as compared with the position where the adhesive layer 14 aforementioned is adhered to. Thus, as shown in FIG. 2, when attempting to tear off the label 10 in the interface between the second layer 16 at the portion of adhesive power reducing layer 22, and that at the portion where the adhesion power reducing layer 22 is not formed and the adhesive layer 14 is exposing as it is, the second layer 16 at the portion of adhesive power reducing layer 22 is torn off from the material A being adhered to, and in addition torn apart from the second layer 16 at the portion of adhesive layer 14, and separated from the material A being adhered to.

Then, on the second layer 16, the portion where the adhesive power reducing layer 22 is not formed, remains on the material A to be adhered to as being adhered thereon. Accordingly, the first layer 20 once being removed can never be re-adhered on the adhesion layer 18, and restoring to the original state is hardly possible, because the second layer 16 is torn in the interface between the portions where the adhesive power reducing layer 22 is formed and not formed, thus the unsealed state is obvious at a glance.

Meanwhile, in the embodiment, in which the label 10 was applied on the cake package, it is understood that these applications are also possible on other sealed portions, such as on medicine packages, envelopes, sealed portions of bags or the like, and price tags indicating prices.

In the meantime, in the present description, an optimum example is enumerated in each case, the sheet, film and the equivalent thereof are generally represented as "sheet". or "film". Furthermore, "sheet" is expressing not only the reaf or separate sheets type, but the rolled type (web) is also included.

Referring more specifically to the embodiment in accordance with the present invention, a further description will be made as follows, based upon an example of production process of the adhering material in accordance with the present invention.

Figure 3:
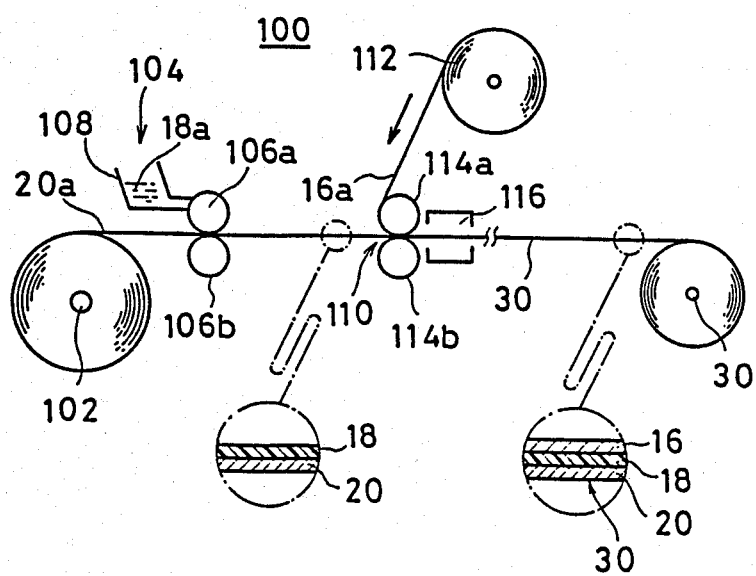
FIG. 3 is an illustrated view showing an example of the apparatus for producing a laminate used in the embodiment in accordance with the present invention.

FIG. 3 is an illustrated view showing an example of the apparatus for producing a laminate 30 used in the embodiment in accordance with the present invention.

The laminate 30 is formed by laminating the adhesion layer 18 and the second layer 16 on the first layer 20 in that order.

An apparatus 100 includes a retaining roller 102 for retaining a first layer material 20a forming the stripped first layer 20 in roll. The first layer material 20a retained by the retaining roller 102 is unrolled at the one end and led to a temporary adhesive coater 104.

The temporary adhesive coater 104 is for duplicate-coating a temporary adhesive 18a, for example, wax, paraffin and the like on one surface of the first layer material 20a, and includes two rollers 106a and 106b and a pan 108. The first layer material 20a coated with the temporary adhesives 18a is sent to a following laminating device 110 for laminating a breakable material 16a forming the second layer 16. The laminating device 110 includes a device 112 for mounting a roll rolled with a breakable material 16a, such as an aluminum foil. In the laminating device 100, the first layer material 20a coated with the temporary adhesive 18a, is pressed and laminated with the breakable material 16a between the rollers 114a and 114b, and guided to a cooler 116 disposed in succession. That is, the rolled breakable material 16a is unrolled at the one end and led between the roller 114a and the roller 114b arranged oppositely thereto. At this time, between the rollers 114a and 114b, the first layer material 20 coated with the temporary adhesive 18a has been led. Thus the temporary adhesive 18a is sandwiched and laminated with the first layer material 20 and the breakable material 16a therebetween. Thus, the laminate 30 laminated with the breakable material 16a is guided to the cooler 116. The cooler 116 is for cooling the temporary adhesive 18a of the laminate 30. In the cooler 116, the temporary adhesive 18a of the laminate 30 is cooled and solidified, and formed as the adhesive layer 18.

Figure 4:
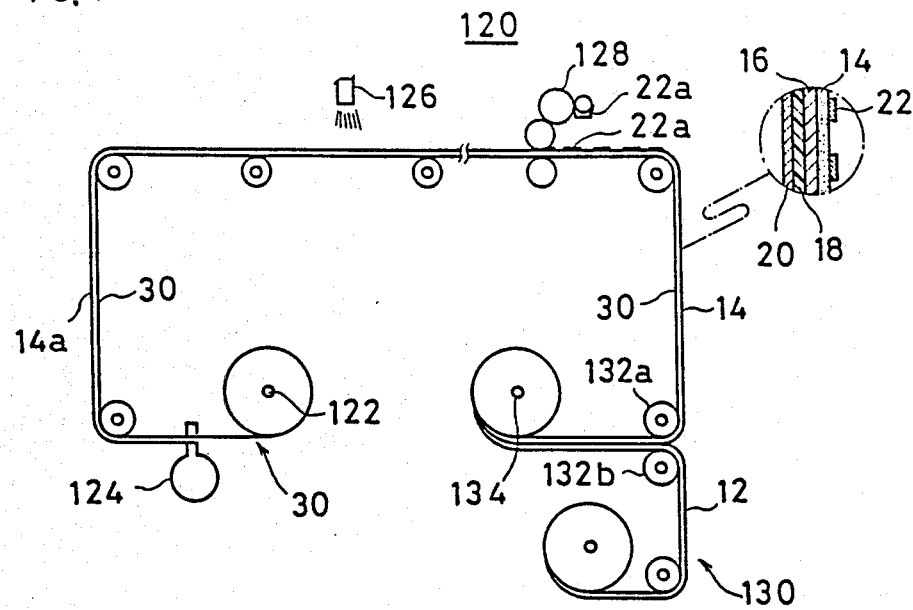
FIG. 4 is an illustrated view showing an example of the apparatus for producing a laminate used in the embodiment in accordance with the present invention.

A roll of the laminate 30 is sent to a laminating apparatus 120 shown in FIG. 4.

The laminating apparatus 120 shown in FIG. 4 includes a device 122 for mounting the roll of the laminate 30, and the laminate 30 pulled out from the roll mounting device 122 is fed to an adhesive coater 124.

As the 14a adhesives 14a which form the adhesive layer 14, a pressure sensitive agent such as a hot melt type pressure sensitive agent is used. When coating such adhesives on the surface of the second layer 16 of the laminate 30, for example, the coater 124 coating the adhesives as heating to the suitable temperatures, as shown in FIG. 4, may be used. The laminate 30 duplicate coated with the adhesives 14a is led to a dryer 126 including a cold air blower, whereby the adhesives 14a is dried and the adhesive layer 14 is formed. The laminate 30 formed with the adhesive layer 14 in such a manner, is guided to a following duplicate coater 128 for forming the adhesive power reducing layer 22. In the duplicate coater 128, an adhesive power reducing material 22a for inactivating the adhesive layer 14, such as varnish, is pattern printed on the surface of the adhesive layer 14 aforementioned.

The duplicate coater 128 is consisting of a well-known printing machine, for example, such as an offset printer, and disposed in the transferring line of the laminate 30, whereby the adhesive power reducing layer 22 pattern printed with the picture lines, for example, "unsealed", is formed on the adhesive layer 14.

The laminate 30 formed with the adhesive power reducing layer 22 is led to a laminating device 130 for the release sheet 12 successively.

The laminating device 130 for the release sheet includes two rollers 132a and 132b, whereby the release sheet 12 formed with a release agent layer 12a on the surface thereof, and the surface of the laminate 30 on the side of the adhesive layer 14 are laminated and wound on the winding roller 134.

Figure 5:
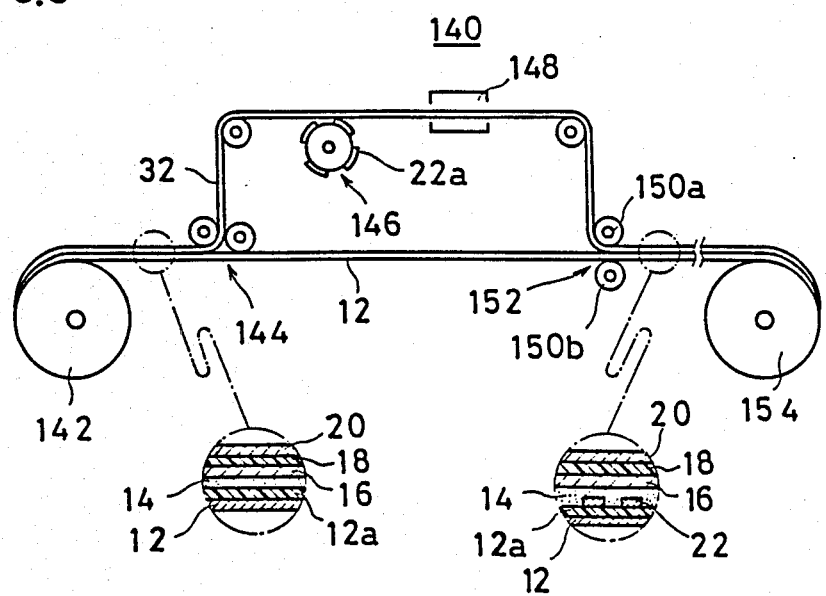
FIGS. 5 and 6 are illustrated views showing another example of the apparatus for producing a laminate used in the embodiment in accordance with the present invention.

The laminating apparatus 140 shown in FIG. 5 is, different from the laminating apparatus 120 shown in FIG. 4, for forming the adhering material by using the laminated material, is prepared by adhering the release sheet 12 temporarily on the adhesive layer 14, which is formed by coating the adhesives 14a on the surface of the laminate 30. The laminating apparatus 140 comprises a device 142 for mounting a rolled laminated material, including the adhesive layer 14 laminated on the main surface of the second layer 16 of the laminate 30, formed by laminating the first layer 20, the adhesion layer 18 and the second layer 16 successively, and the release sheet 12 adhered temporarily on the main surface of the adhesive layer 14.

The laminated material pulled out from the roll mounting device 142, is led to a separating device 144 for separating the laminated material 32 of the first layer 20, the adhesion layer 18, the second layer 16 and the adhesive layer 14, and the release sheet 12 adhered temporarily on the adhesive layer 14. The separating device 144 includes rollers for separating the laminated material 32 and the release sheet 12, and the laminated material 32 separated from the release sheet 12 thereat, and formed by the first layer 20, the adhesion layer 18, the second layer 16 and the adhesive layer 14, is led to a duplicate coater 146 of an adhesive power reducing material 22a.

The adhesive power reducing material coater 146 consisting of a well-known printing machine or a coater is for duplicate coating the printed lines of suitable letter and pictures, for example, such as "unsealed" on the part of the adhesive layer 14.

The laminated material 32 duplicate coated with suitable pattern in the adhesive power reducing material coater 146, is led to a dryer 148.

The dryer 148 includes ultraviolet rays irradiating device and so on, when UV type ink is duplicate coated in the adhesive power reducing material coater 146.

For resticking the release sheet 12 and the laminated material 32 separated by the separating device 144 previously mentioned, after the adhesive power reducing material 22a has been dried in the dryer 148, the laminated material 32 is guided to a re-adhering device 152 including rollers 150a and 150b.

The laminated material 32 re-adhered to with the release sheet 12 by the re-adhering device 152, and formed by the first layer 20, the adhesion layer 18, the second layer 16 and the adhesive layer 14 formed with the adhesive power reducing layer 22 thereon, is wound by a winding roller 154.

Figure 6:
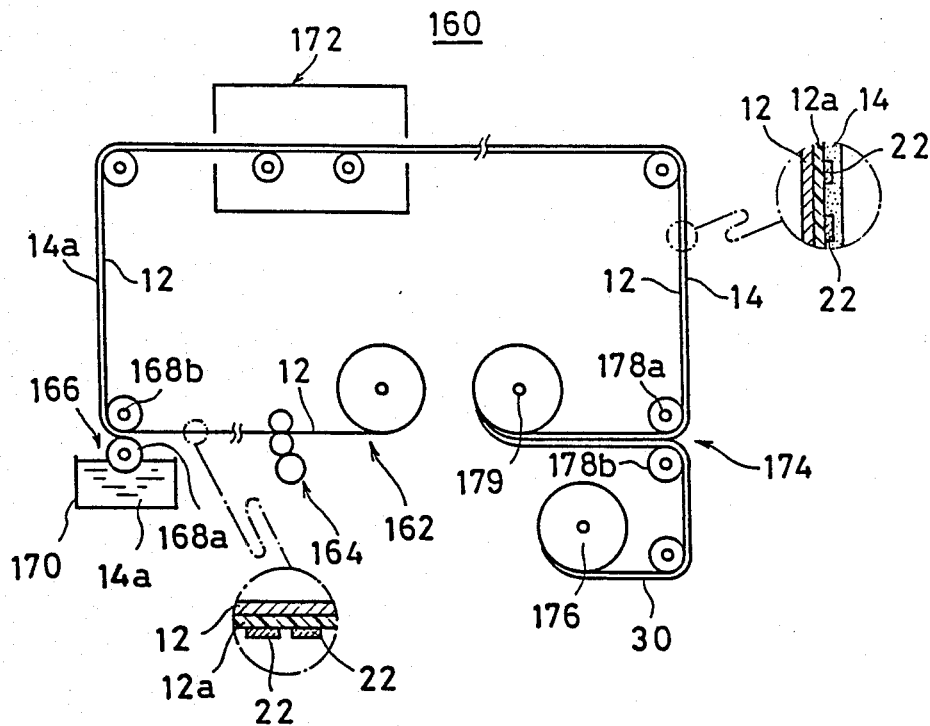

FIG. 6 is an illustrated view showing a further separate laminating apparatus 160, substituting the laminating apparatus 120 shown in FIG. 4.

The laminating apparatus 160 comprises a roll mounting device 162 for mounting a rolled release sheet 12.

The release sheet 12 pulled out from the roll mounting device 162 of the rolled release sheet 12, is led to an adhesive power reducing material coater 164 as the coater of the adhesive power reducing material 22a, as facing the surface of the release agent layer 12a thereof downward in FIG. 6, and varnish and so on as the adhesive power reducing material is duplicated coated therein. The release sheet 12 duplicate coated with the picture lines formed by the suitable pattern, in the adhesive power reducing material coater 164, is guided to an adhesive coater 166 successively.

The adhesive coater 166 is for coating the adhesives 14a on the surface of the peeling agent layer 12a of the release sheet 12, and includes a main roller 168a and a roller 168b disposed oppositely thereto. The main roller 168a is dipped into the adhesives 14a held in a pan 170 at the lower portion thereof, and the adhesives 14a is coated by the main roller 168a on the surface of the peeling agent layer 12a of the release sheet 12, held between the main roller 168a and the roller 168b.

Then, the release sheet 12 coated with the adhesives 14a is guided, for example, to a dryer 172 including a heater. In the dryer 172, the adhesives 14a duplicate coated on the release sheet 12 is dried and formed as the adhesive layer 14, and the laminate of the adhesive layer 14, and the laminate of the adhesive layer 14 and the release sheet 12 is led to a laminating device 174, and laminated with the laminate 30 prepared separately and formed by the first layer 20, the adhesion layer 18 and the second layer 16.

The laminating device 174 of the laminate 30 includes a device 176 for mounting the rolled laminate 30. The laminate 30 unrolled from the roll mounting device 176 is led between two rollers 178a and 178b, and surfaces of the adhesive layer 14 formed on the release sheet 12 aforementioned and the second layer 16, are pressed together by the two rollers 178a and 178b, and wound on a winding roller 179 in that state.

In the adhering material produced by the laminating apparatus, the adhesive power reducing layer 22 duplicate coated on the surface of the peeling agent layer 12a is on the surface of the peeling agent layer 12a at the beginning, but after being laminated with the laminate 30, for example, when the release sheet 12 has been removed from the surface of the adhesive layer 14 on application, the adhesive power reducing layer 22 will be transferred and transpositioned on the surface of the adhesive layer 14 by the adhesive power of the adhesive layer 14, due to the separatory nature of the peeling agent layer 12a of the release sheet 12.

For producing labels from the adhering material formed as such, the sticking material may be mounted on an apparatus for producing labels, including a printing machine and so on.

Figure 7:
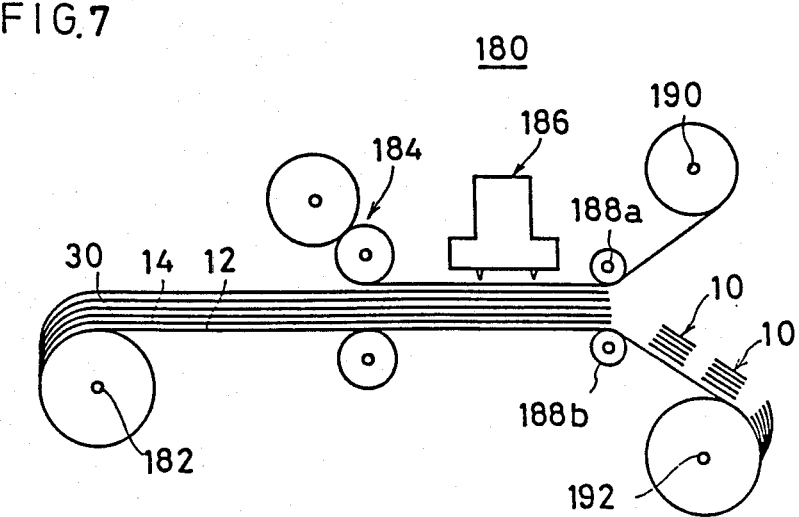
FIG. 7 is an illustrated view showing an example of the apparatus for producing a label.

FIG. 7 is an illustrated view showing an example of the apparatus for producing labels.

Such label producing apparatus 180 comprises a retaining device 182 for mounting the rolled laminate 30, formed by laminating the release sheet 12 on the surface of the adhesive layer 14.

The laminated material consisting of the release sheet 12 and the laminate 30, and pulled out from the retaining device 182, is guided to the printing device 184.

The printing device 184 is consisting of a well-known printing machine, for example, such as an offset printer. Then, with the printing device 184, the picture lines, for example, such as the "trade name" is printed on the first layer 20. The laminating material formed with the printed layer 24 in such a manner, is led to a stamping machine 186. The stamping machine 186 includes a so-called die cutter having a cutting blade, whereby cuts having a suitable shape are made on the first layer 20, the adhesion layer 18, the second layer 16, the adhesive layer 14 and the printed layer 24.

Meanwhile, the stamping machine may be of the type using a roller with cutting edge, namely, a die roller.

The laminated material with cuts is divided into, unnecessary portions and the labels 10 (necessary portion) by the rollers 188a and 188b, whereby the unnecessary portions are wound by a selvage roller 190 in rolls, and the labels 10 (necessary portions) are wound by a winding roller 192 in rolls as being attached temporarily on the release sheet 12. In the meantime, in place of the stamping machine 186 and the winding roller 192, a cut forming machine having cutting blades may be used. The cutting blades are for providing cuts on the first layer 20, the adhesion layer 18, the second layer 16 and the adhesive layer 14 for separating in an individual label 10.

Here, the description will be made more specifically as follows, (1) As the first layer, a polyester film having a thickness of approximately $50\mu$ is used, whereon wax by Nihon Seiro Co. as a waxing agent forming a temporary adhesion layer, is coated to form the adhesion layer.

Then, an aluminum foil having a thickness of $7\mu$ forming the second layer, was laminated on the temporary adhesion layer to dry and solidify the molten wax aforementioned.

In addition, on the surface of aluminum foil, an acrylic adhesives (BPS-5127) by Toyo Ink Mfg. Co., Ltd. is coated to the dried film thickness of $5-50\mu$ to form the adhesive layer 14. Then, varnish by Toyo Ink Mfg. Co., Ltd. is part coated to the thickness of $100-0.5\mu$.

Thereafter, separation paper by Shikoku Paper Co. was applied on the surface of the adhesive layer 14.

At this time, an adhesive power (a) of the adhesive layer at the position of adhesive power reducing layer was about 1 g, a force (b) required to tear the second layer was about 200 g, a force (c) required to separate the second layer from the adhesion layer was approximately 400 g, an adhesive power (d) of the adhesive layer outside the position of adhesive power reducing layer was approximately 2,000 g and a force (e) required to separate the release sheet from the adhesive laye was about 20 g.

The pressure sensitive adhering sheet prepared as such was made into label pieces and adhered on the material being adhered on (paper boxes, etc.).

An adhesive power (d) to the material being adhered on at this time was 2,000 g.

When attempting to tear off the adhered on label forcibly from the material being adhered on, the second layer at the position of adhesive power reducing layer, was torn at the interface with the second layer at the position where the adhesive power reducing layer is not formed, and came off from the material being adhered on together with the polyester film forming the first layer.

(2) As the first layer, a nylon film having a thickness of about 50μ is used, whereon wax by Nihon Seiro Co. as a waxing agent forming the temporary adhesion layer is coated to form the adhesion layer.

Then a brittle film by Nihon Carbide Co. having a thickness of 7μ and forming the second layer, was coated on the adhesion layer to dry and solidify the molten wax aforementioned.

In addition, on the surface of brittle film, an acrylic adhesives (BPS-5127) by Toyo Ink Mfg. Co., Ltd. is coated to the dried film thickness of 5-50μ to form the adhesive layer 14. Then, UV ink by Toya Shikiso Co. is coated to the thickness of 100-0.5μ to form the adhesive power reducing layer.

Thereafter, separation paper by Shikoku Paper Co. was applied on the surface of the adhesive layer 14.

At this time, an adhesive power (a) of the adhesive layer at the position of adhesive power reducing layer was about 2 g, a force (b) required to tear the second layer was approximately 50 g, a force (c) required to separate the second layer from the adhesion layer was approximately 100 g, an adhesive power (d) of the adhesive layer outside the portion of adhesive power reducing layer was about 1,500 g, and a force (e) required to separate the release sheet from the adhesive layer was about 15 g.

The pressure sensitive adhering sheet prepared as such was made into label pieces and adhered on the material being adhered on (boxes, etc.).

An adhesive power (d) to the material being adhered on at this time was 1,000 g.

Figure 8:
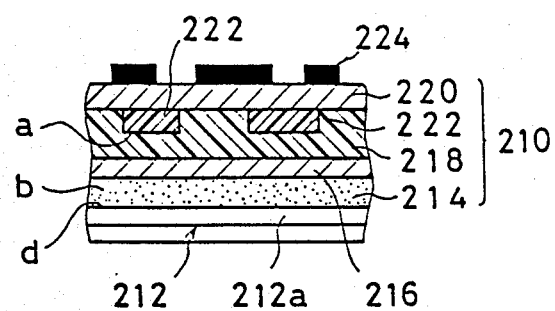
FIG. 8 is a cross-sectional view showing a separate embodiment in accordance with the present invention.

When attempting to tear off the label which has been adhered on forcibly from the material being stuck, the second layer at the position of adhesive power reducing layer, was torn in the interface with the second layer at the position where the adhesive power reducing layer is not formed, and came off from the material being adhered on, together with the nylon film forming the first layer. FIG. 8 is a cross-sectional view showing another embodiment in accordance with the present invention. A label 210 of the embodiment is adhered on temporarily on a release sheet 212, and an adhesive layer 214, a second layer 216, an adhesion layer 218, a peeling agent layer 222 and a first layer 220 are laminated successively, and a printed layer 224 is formed on the first layer 220.

The adhesive layer 214 is for providing an adhesive power to the label 210, and composed of adhesives, for example, such as a pressure sensitive adhesive and formed between the release sheet 212 and the second layer 216.

The second layer 216 is formed by an aluminum foil or a resin film and so on, prepared by mixing and coating silver or gold powder or carbon black and other pigments in a synthetic resin. The second layer 216 is for sealing, for example, the opening of the package, and bringing the unsealed state by cutting and tearing, when the sealed portion is unsealed.

The adhesion layer 218 adheres the second layer 216 with the first layer 220, and is formed by coating a double fluid reactive copolymer resin, for example, an urethane resin and other resins such as EVA, PVA, vinyl-chloride, vinyl-acetate, and acrylic, on the surface where the peeling agent layer 222 is formed. In the meantime, as another example of the adhesion layer 218, the adhesive layer coated with heat curing adhesives such as the polyester group, polyurethane group and so on may be given.

The peeling agent layer 222 is so formed that the adhesion layer 218 and the first layer 220 can be easily separated in a state whereby re-adhering is impossible, and coated with a peeling agent, for example, such as a silicon resin, a fluororesin, wax and so on, and formed between the adhesion layer 218 and the first layer 220. The peeling agent layer 222 is formed on the part of the surface of the first layer 220 and printed with, for example, the picture lines such as "unsealed", on the portion where the peeling agent layer 222 is excised.

The first layer 220 is formed to protect the adhesion layer 218 from cutting and tearing, and adhered temporarily on the adhesion layer 218 via the peeling agent layer 222, and adhered closely to the adhesion layer 218 at the position where the peeling agent layer 222 is formed. Meanwhile, as an example of the first layer 220, the material having firmness in comparison and not susceptible to shrink by heat, for example, such as polyester and a nylon film, or paper or synthetic paper may be given, but those having a relatively flexible property so as not to be separated by the first layer 220, restoring to the original state against the adhesive power of the adhesion layer 218, when the label is bent and adhered on the sealed portion, are suitable.

The peeling agent layer 212 is for protecting the adhesive layer 214 and includes peeling paper, for example, such as paper and a synthetic resin sheet, and formed with a peeling agent layer 212a formed by duplicate coating a peeling agent, for example, such as silicon, etc. on the surface of the base material such as paper and so on.

Figure 9:
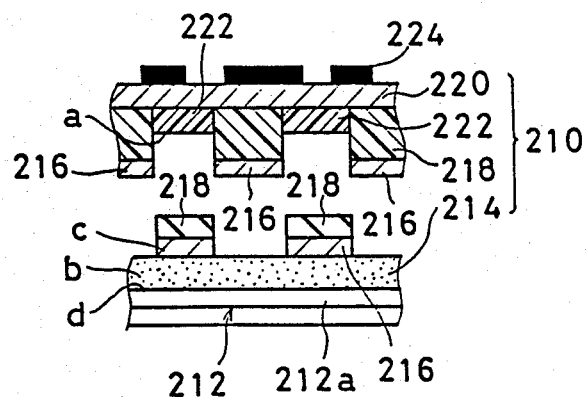
FIG. 9 is a cross-sectional view showing an application of the embodiment shown in FIG. 8.

Meanwhile, as shown in FIG. 9, the label 210 is so constituted that, forces required to separate respective portions satisfy the equation $d<a<c<b$, when a force required to separate the first layer 220 from the adhesion layer 218 at the peeling agent layer 222 is denoted as a, an adhesive force of the adhesive layer 214 adhered to the material being adhered on is represented by b, a force required to tear the second layer 216 is given as c, and a force required to separate the release sheet 212 from the adhesive layer 214 is denoted as d.

In order to open the opening of the package with the label 210 adhered on the opening formed with the first layer 220 and the adhesion layer 218 and so on, the label 210 applied thereon must be removed to open the sealed portion. In this case, since the first layer 220 is weakly adhered temporarily on the adhesion layer 218 via the peeling agent layer 222, while the second layer 216 is firmly adhered to the opening of the package by the adhesive layer 214, as shown in FIG. 9, when attempting to tear off the label 210, at the portion of the peeling agent layer 222, only the first layer 220 can be torn off and the adhesion layer 218 and the second layer 216 will remain as adhering on the sealed portion together with the adhesive layer 214. Then, as shown in FIG. 9, at the portion where the peeling agent layer 22 is excised, the second layer 216 is adhered by the adhesion layer 218, so that the relatively breakable second layer 216 is torn at the interface between the portions where the peeling agent layer 222 is formed and not formed, and separated from the adhesive layer 214 together with the first layer 220. Accordingly, when the first layer 220 has been once removed, re-adhering the first layer 220 on the adhesion layer 218, as well as restoring to the original state is hardly possible, thus the unsealed state can be recognized at a glance.

In order to open the opening of the package completely, the adhesion layer 218 remained untorn must be cut or torn or separated from the sealed portion.

Figure 10:
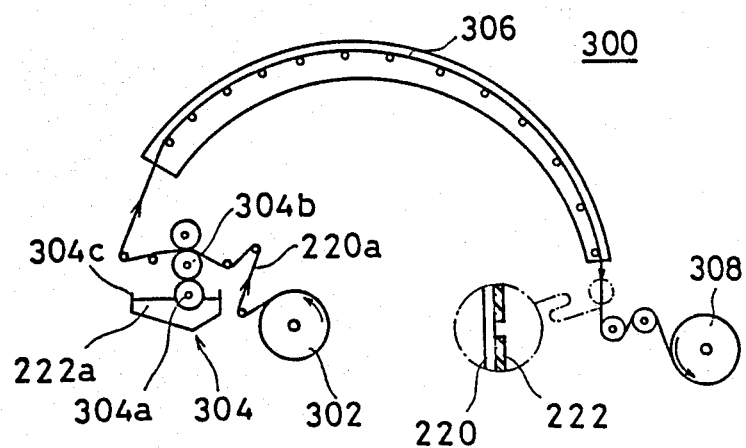
FIGS. 10 and 11 are illustrated views showing an example of the apparatus for producing a base material used in a separate embodiment in accordance with the present invention.
Figure 11:
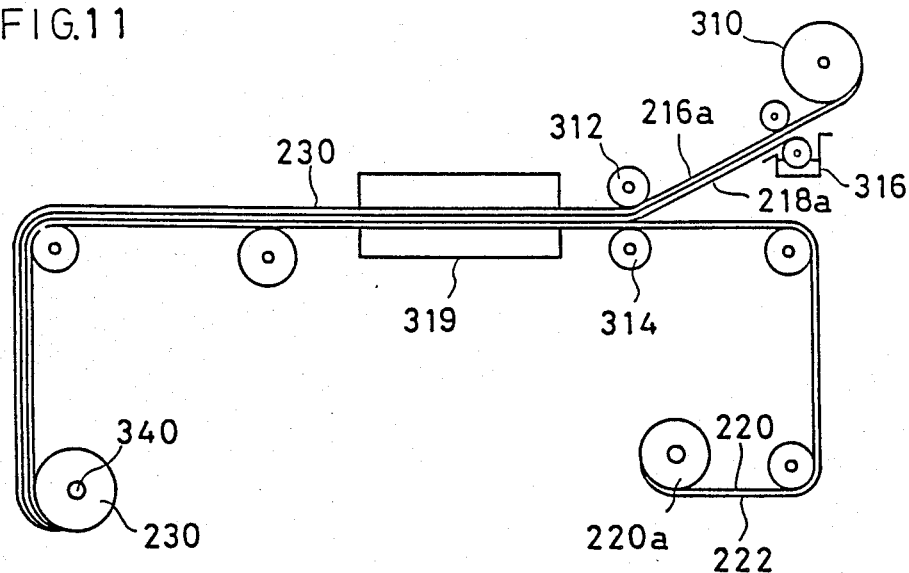

FIGS. 10 and 11 are illustrated views showing examples of the apparatus for producing a base material used in the embodiment in accordance with the present invention.

The base material 230 is formed by laminating the peeling agent layer 222 and the adhesion layer 218 on the first layer 220 in that order.

The apparatus 300 comprises a retaining roller 302 for retaining a rolled film material 220a forming the stripped first layer 220.

The film material 220a retained by the retaining roller 302 is unrolled at the one end and guided to a peeling agent coater 304.

The peeling agent coater 304 is for duplicate coating a peeling agent 22a, for example, such as a silicon resin, a fluororesin, etc. on the surface or reverse sides of the film material 220a, and includes two rollers 304a and 304b. The roller 304a is dipped into the peeling agent 222a held in a pan 304 at the lower portion thereof. Accordingly, by rotating the rollers 304a and 304b, the peeling agent 222a is coated on the surface of the film material 220a guided therebetween. In the meantime, as the peeling agent coater 304, a photogravure roller coater or a reverse roller coater and so on may be used, or a well-known printing machine such as an offset printer or a screen printing machine such as an offset printer or a screen printer may be also used.

Then, the film material 220a duplicate-coated with the peeling agent 222a, is fed, for example, to a dryer 306 including a heater. In the dryer 306, the peeling agent 222a duplicate-coated on the film material 220a is dried and formed as the peeling agent layer 222. The film material 220a formed with the peeling agent layer 222 as such, is guided to a winder 308.

The film material 220a rolled in a roll, is mounted on a separate laminating apparatus 310 of the second layer 216 shown in FIG. 11.

The laminating apparatus 310 comprises a device for mounting the rolled film 216a, and the aluminum foil 216a forming the second layer 216 and pulled out from the roll, is led to a coater 316 including two rollers and a pan holding a resin or adhesives 218a forming the adhesion layer 218, which is coated on the surface thereof by the rotation of the two rollers, thereafter guided between two rollers 312 and 314, whereby the aluminum foil 216a is laminated and adhered by the adhesive layer 218a on the surface thereof, on the peeling agent layer 222 of the first layer 220 guided separately, and fed to an adhesion device 319. As the adhesion device 319, when adhesives containing water-soluble resins such as a PVA group, a vinyl acetate group, an acrylic group and so on or solvent type resins consisting of vinyl chloride, vinyl acetate, urethane, acrylic and so on are used as the adhesives 218a, a dryer is used, and when hot-melt type adhesives of a rubber group and an EVA group are used, a cooler is used.

The base surface material 230 formed in such a manner, is provided with a printed layer 224 in a suitable printing device, and wound and retained in roll by a winding roller 340.

Figure 12:
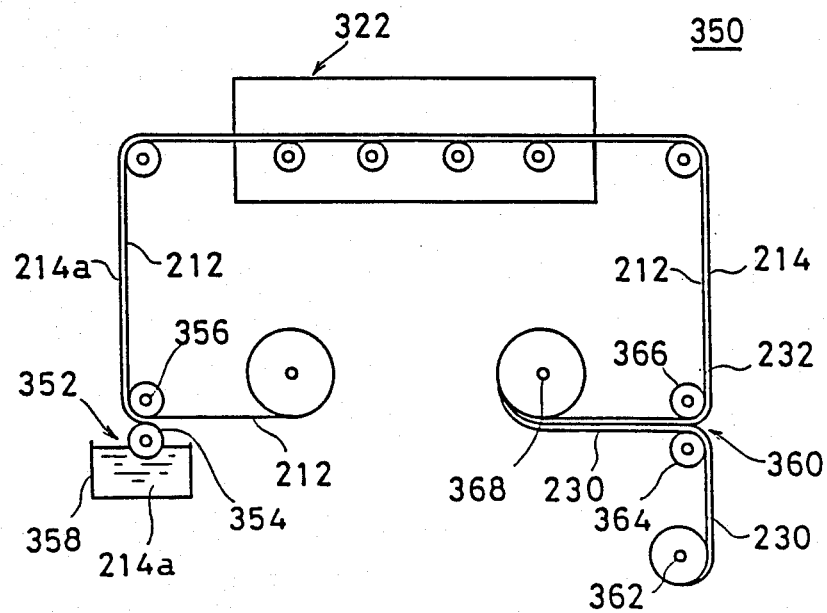
FIG. 12 is an illustrated view showing an example of the apparatus for further laminating an adhesive layer 214 and a peeling sheet 212, by using a base material 230 shown in FIG. 10.

FIG. 12 is an illustrated view showing an example of the apparatus for further laminating the adhesive layer 214 and the release sheet 212, by using the base material 230 shown in FIG. 10.

The apparatus 350 comprises an adhesive coater 352.

The adhesive coater 352 is for coating the adhesives 214a on the release sheet 212, and includes a main roller 354 and a roller 356 disposed oppositely thereto. The main roller 354 is dipped into the adhesives 214a held in a pan 358 at the lower portion thereof, and the adhesives 214a is coated on the surface of the release agent layer 212a of the release sheet 212 held therebetween, by the main roller 354.

Then, the release sheet 212 duplicate-coated with the adhesives 214a is led, for example, to a dryer 322 including a heater. In the dryer 322, the adhesives 214a duplicate-coated on the release sheet 212 is dried and formed as the adhesive layer 214. The release sheet 212 formed with the adhesive layer 214 as such, is led to the laminating device 360 of the base material 230.

The laminating device 360 is for laminating the base material 230 on the adhesive layer 214 of the laminate 232 of the release sheet 212 and the adhesive layer 214, and includes a retaining roller 362 for retaining the rolled base material 230. The base material 230 retained in roll, is unrolled at the one end and guided between rollers 364 and 365. At this time, the laminate 232 coated with the adhesives has been guided therebetween, thus, between the rollers 364 and 365, the base material 230 and the release sheet 212 sandwiching the adhesive layer 214 are laminated. The base material 230 laminated with the laminate 232 of the release sheet 212 and the adhesive layer 214 in such a manner, is fed to a winding roller 368.

Then, the base material 230 with the release sheet 212 laminated by the adhesive layer 214 may be led, for example, to an apparatus for producing labels shown in FIG. 7, as same as the embodiment previously mentioned, and made into labels.

Here, the embodiment will be described more specifically as follows, (1) As the first layer, a polyester film having a thickness of about $50\mu$ is used, whereon a silicon resin by Toray Industries, Inc. used as the peeling agent forming the peeling agent layer, is coated together with a curing agent so as to leave partly uncoated portions, and baked in the dryer to form the peeling agent layer partly. Then, an urethane resin forming the adhesion layer is coated on the first layer and the peeling agent layer to the thickness of about $5-50\mu$. In addition, an aluminum foil wa laminated on the molten urethane resin surface to dry and solidify the urethane resin. A force required to tear off the urethane resin from the peeling agent layer at this time was 50 g. While, an acrylic adhesives (BPS-5127) by Toyo Ink Mfg. Co., Ltd. is coated on the release paper by Shikoku Paper Co. to the dried film thickness of 5-50μ to form the release sheet, which was then stuck together with the aforementioned double layer product. At this time, a force (c) required to tear the second layer was 100 g, and a force (d) required to tear off the separation paper from the adhesives was 10 g. The pressure sensitive material prepared in such a manner was made into labels, and stuck on the materials being adhered on (paper boxes, plastic and glass bottles). An adhesive power (b) to the material being adhered on at this time was 1,500 g. When attempting to tear off the adhered on label forcibly, the film of the first layer was separated from the adhesive layer together with the aluminum foil, at the portion where the peeling agent layer is not formed.

Meanwhile, the same results were obtained by the labels produced in a same manner, except the coated paper was used as the first layer and the EVA resin in the following Table-1 was coated on the surface thereof.

TABLE 1

| | Components | Composition (Parts) |
|---|---|---|
| Ethylene vinyl-acetate co-polymer | Vinylacetate content 10~50%<br>Melt index (MI) 2~500<br>Molecular weight 10,000~100,000 | 20~50 |
| Adhesion-dative resin | Rosin<br>Hydrogenerated rosin glycerol-ester<br>Polyterpene resin<br>Terepene-phenol resin<br>C5 group petroleum resin<br>C4 group petroleum resin<br>Alicyclic group hydro-generated petroleum resin | 20~60<br>(0~60) |
| Wax, Oil | Paraffin wax<br>Microwax<br>Polyethylene wax<br>Polypropylene wax<br>Paraffin group, Naphtene group oils | 5~50<br>(0~70) |
| Heat stabilizer | | |
| Aging preventing agent | | |

Remark:
In place of ethylene vinylacetate copolymer resin, SIS SBS, polyisobutylene and polybutene may be used.

Figure 13:
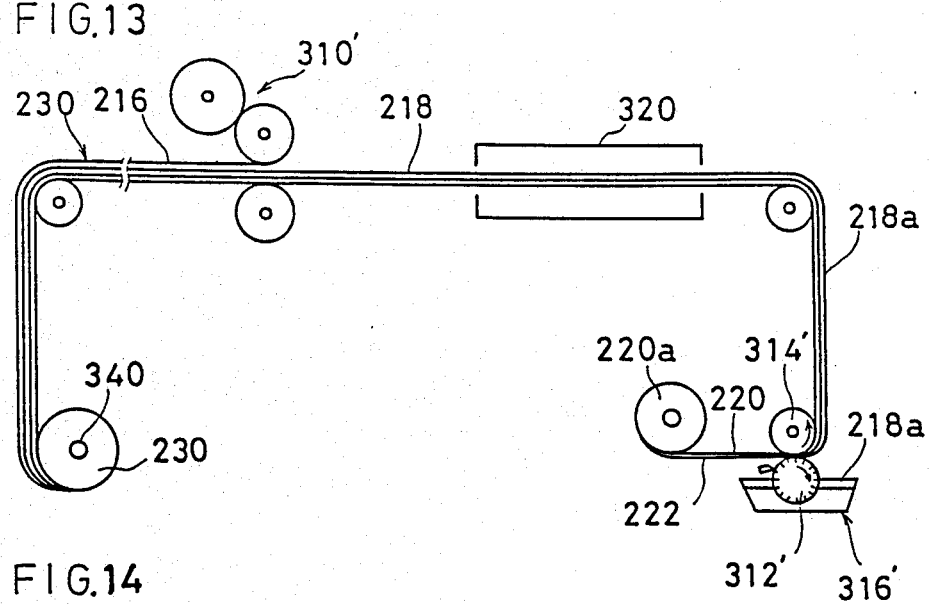
FIG. 13 is an illustrated view showing an example of the apparatus for producing a base material 230, by laminating a second layer 216, using a double layer product of a first layer 220 and a peeling agent layer 222 shown in FIG. 9.

(2) As the first layer, a nylon film having a thickness of about 70 was used, and wax as the peeling agent forming the peeling agent layer was coated and dried. Then, the polyester group adhesives and so on forming the adhesive layer is coated on the wax to the thickness of about 5-50μ. In addition, an aluminum foil was laminated on the molten adhesive layer to dry and solidify the polyester group adhesives. At this time, a force (a) required to tear off the adhesives from the wax surface was 50 g. The double layer product of the the nylon film and the second layer formed in such a manner, and the release sheet formed by coating the adhering agent to the separation paper to the dried film thickness of 5-5μ, were adhered on together. A force (d) required to separate the separation paper from the adhering agent at this time was 10 g. The pressure sensitive material formed as such was made into labels and adhered on the material being adhered on (paper boxes, plastic and glass bottles). An adhesive power (b) to the material being adhered on at this time was 1,500 g. When attempting to separate the label which had been forcibly adhered on the film of the first layer was torn off together with the aluminum foil, at the position where the peeling agent layer is not formed, FIG. 13 is an illustrated view showing an apparatus, substituting the apparatus for producing the base material shown in FIG. 11.

In the apparatus, different from the apparatus shown in FIG. 11, in place of the laminating device 310 for laminating the aluminum foil 216a, a coater 316 for coating a resin forming the adhesion layer 218, and a laminating device 310 for coating a synthetic resin mixed with gold and silver powder instead of the aluminum foil, on the peeling agent layer 222 on the first layer 220 and the adhesion layer 218, are disposed.

The coater 316' includes two rollers 312 and 314. The roller 312' is dipped into the resin 218a such as the urethane resin or EVA resin held in a pan at the lower portion thereof. Accordingly, by rotating the two rollers 312' and 314', the resin 218a is duplicate-coated on the peeling agent layer 222 of the film 220 guided therebetween. Then, the film 220 coated with the resin 218a is guided further to a dryer 320 and dried and solidified. Thereby, the resin 218a is coated on the peeling agent layer 222 on the first layer 220 and the adhesion layer 218 is formed, and sent to the following laminating device 310' of the second layer. The laminating device 310' is consisting of a well-known printing machine or coater, for example, such as an offset printer, and disposed in the transferring line of the base material 230. Then, by the laminating device 310', the resin mixed with the gold or silver powder is coated on the adhesion layer 218, and the second layer 216 is formed.

Figure 14:
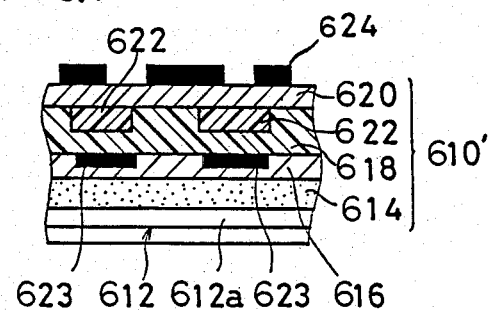
FIG. 14 is a cross-sectional view of a further separate embodiment.

FIG. 14 is cross-sectional view of a separate embodiment.

The label 610 is formed by print-forming a picture line layer 623 suitably on the surface of an aluminum foil, or a resin film forming the second layer 616 in such that, when the first layer is torn off, the picture line layer 623 will become visible. The picture line 623 is formed on the surface of the second layer 616 in advance and laminated, in case the second layer 616 is formed with the aluminum foil. When the second layer 616 is formed by coating the resin, the rint-forming may be made after the resin film is formed.

Meanwhile, the picture line layer 623 may be colored by coating a coating material with a suitable coater.

As a synthetic resin forming the resin film, the synthetic resin composed by mixed melting metal powder therein, and formed so as to be cut and torn by providing a relatively weak force, may be selected and coated to form the second layer 616.

Figure 15:
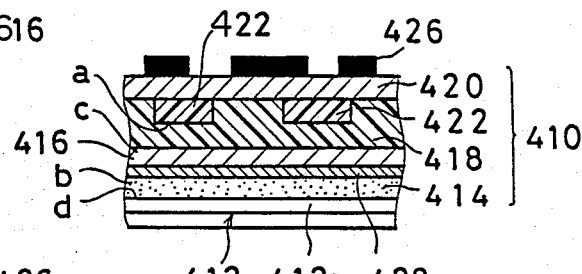
FIG. 15 is a cross-sectional view showing one embodiment in accordance with the present invention.

FIG. 15 is a cross-sectional view showing further separate embodiment in accordance with the present invention. A label 410 of the embodiment is adhered temporarily on a release sheet 412, and an adhesive layer 414, a third layer 428, a second layer 416, an adhesion layer 418, a peeling agent layer 422 and a first layer 420 are laminated successively. On the surface of the first layer 420, a printed layer 426 is formed.

In the embodiment, different from the aforementioned embodiment shown in FIG. 8, the third layer 428 is interposed between the second layer 416 and the adhesive layer 412.

The third layer 428 protecting the adhesive layer 414 from being exposed, when the second layer 416 has been torn off as to be described later, is formed by coating ethylenevinyl acetate copolymer and so on.

Figure 16:
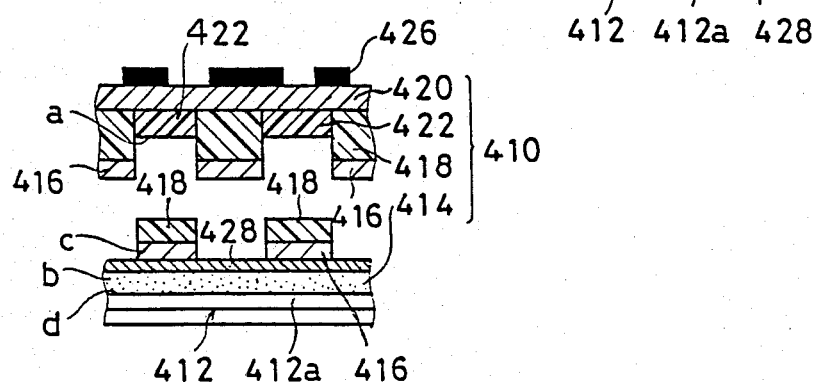
FIG. 16 is a cross-sectional view showing an application of the embodiment shown in FIG. 15.

Meanwhile, as shown in FIG. 16, the label 410 is constituted as such that, forces required to separate respective portions satisfy the equation $d<a<c<b$, when a force required to separate the first layer 420 from the adhesion layer 418 at the peeling agent layer 422 is represented by a, and adhesive power of the adhesive layer 414 with the material being adhered is denoted as b, a force required to tear the second layer 416 is given by c, and a force required to separate the release sheet 412 from the adhesive layer 414 is denoted as d.

The peeling agent layer 422 is formed by the aforementioned apparatus shown in FIG. 10, and a rolled film material 420a is mounted on a separate laminating apparatus 510 of the second layer 416 shown in FIG. 17.

The laminating apparatus 510 comprises a device for mounting the rolled film 420a. An aluminum foil 416a forming the second layer 416 and pulled out from the separate roll, is guided to a coater 516 including two rollers and a pan, holding a resin or an adhesions 418a forming the adhesion layer 418, and coated with the resin or the adhesives 418a by the rotation of the two rollers. Thereafter, it is led between two rollers 512 and 514, and laminated and adhered on the surface of the peeling agent layer 422 of the first layer 420 guided separately, by the adhesion layer 418a on the surface thereof, and led to an adhesion device 519.

Then, the base material 430 is fed to a following laminating device 530 of the third layer. The laminating device 530 is consisting of a well-known printing machine, for example, such as an offset printer. By the laminating device 530, the synthetic resin of ethylenevinyl acetate copolymer and so on is coated on the surface of the second layer 416 to form the third layer 428.

The base material 430 formed with the second layer 416 and the third layer 428 in such a manner, is wound and retained by a winding roller 540 in roll.

The base material 430 shown in FIG. 17 is further laminated with the adhesive layer 414 and the release sheet 412, by the apparatus (e.g. apparatus shown in FIG. 12) for laminating the two layers by the same process described in the aforementioned embodiment shown in FIG. 8.

Here, the description will be made more specifically as follows, (1) As the first layer, a polyester film having a thickness of about $50\mu$ is used, whereon a silicon resin by Toray Industries, Inc. used as the peeling agent forming the peeling agent layer is coated together with a curing agent so as to leave partly uncoated portions, and baked in the dryer to form the peeling agent layer partly. Then, an urethane resin forming the adhesion layer is coated on the peeling agent layer to the thickness of about $5-50\mu$. In addition, an aluminum foil was laminated on the molten urethane resin surface to dry and solidify the urethane resin. Then, the EVA resin in Table 1 previously mentioned, is coated on the aluminum foil. At this time, a force required to tear off the urethane resin from the peeling agent layer was 50 g. While, an acrylic adhesive (BPS-5127) by Toyo Ink Mfg. Co., Ltd. is coated on the separation paper by Shikoku Paper Co. to the dried film thickness of $5-50\mu$ to form the release sheet, which was then adhered on together with the double layer product previously mentioned. At this time, a force (c) required to tear the second layer was 100 g and a force (d) to separate the release paper from the adhesives was 10 g. The pressure sensitive prepared in such a manner was made into labels and adhered on the material being adhered (paper boxes, plastic and glass bottles). An adhesive power (b) to the material being adhered on at this time was 1,500 g. When attempting to tear off the label which had been forcibly adhered on, the film of the first layer was separated from the adhesive layer together with the aluminum foil at the portion where the peeling agent layer is not formed.

(2) As the first layer, a nylon film having a thickness of about $70\mu$ is used, whereon wax used as the peeling agent forming the peeling agent layer is coated so as to leave partly uncoated portion, and baked in the dryer to form the peeling agent layerpartly. Then, an polyester group adhesives forming the adhesion layer is coated on the peeling agent layer to the thickness of about $5-50\mu$. In addition, an aluminum foil was laminated on the molten adhesives surface to dry and solidify the adhesives resin. Then, the EVA resin is coated on the aluminum foil. At this time, a force required to tear off the adhesives from the wax layer was 50 g. While an adhesive is coated on the release paper to the dried film thickness of $5-50\mu$ to form the release sheet, which was then adhered on together with the double layer product previously mentioned. At this time, a force (d) to separate the release paper from the adhesive was 10 g. The pressure sensitive material prepared in such a manner was made into labels and adhered on the material being adhered on (paper box, plastic and glass bottles). An adhesive power (b) to the material being adhered on at this time was 1,500 g. When attempting to tear off the label which had been forcibly adhered on, the film of the first layer was separated from the adhesive layer together with the aluminum foil at the portion where the peeling agent layer is not formed.

FIG. 18 is a cross-sectional view of a separate embodiment.

In the embodiment, a suitable picture line layer 713 is print-formed on the surface of an aluminum foil or a resin film forming a second layer in such that, when a first layer 720 has been torn off, the picture line layer 723 will become visible. The picture line layer 723 is formed on the surface of the second layer 716 in advance and laminated, in case the second layer 716 is formed with the aluminum foil. When the second layer 716 is formed by coating the resin, the print-forming may be made after the resin film is formed. Furthermore, on the reverse side of the third layer 728, a suitable picture line layer 725 is also print-formed in such that, when the second layer 725 has been torn off from the third layer 728, the latter will become visible. The picture line layer 725 is print-formed after forming the third layer 728.

Meanwhile, the picture line layers 723 and 725 may be colored by coating a coating material with a suitable coater.

Also, fixed letters or patterns may be formed by combining the two kinds of picture line layers 723 and 725, when the first layer 720 has been torn off.

As a synthetic resin forming the resin film, the synthetic resin composed by mixed melting metal powder therein, and formed so as to be cut and torn by providing a relatively weak force, may be selected and coated to form the second layer 716.

Meanwhile, when the second layer 716 does not separate easily from the third layer 728, before coating and laminating the synthetic resin forming the third layer 728, a peeling agent such as a silicon resin may be coated on the main surface after the second layer 716 is laminated and formed, to facilitate the separation.

What is claimed is:

1. A label for preventing reuse comprising
    a first layer,
    a first adhesion layer formed on said first layer,
    a peeling agent layer laminated between said first layer and said first adhesion layer being partly excised so as to contact the first layer directly with the first adhesive layer,
    a second layer laminated and adhered on said first layer by said first adhesive layer, and
    a second adhesive layer formed on said second layer, wherein said second layer is forme so as to be torn from the second adhesive layer, at a position in which said peeling agent layer is not formed on said first layer and satisfies the following formula:

a<c<b wherein the force required to separate the first layer from the first adhesion layer at the position in which the peeling agent layer is formed in represented by (a), the adhesive force of the second adhesive layer when adhered to a material to be labeled is represented by (b) and the force required to tear the second layer is represented by (c).

2. A label for preventing reuse comprising
    a first layer,
    a first adhesion layer formed on said first layer,
    a peeling agent layer laminated between said first layer and said first adhesion layer being partly excised so as to contact the first layer directly with the first adhesive layer,
    a second layer laminated and adhered on said first layer by said first adhesive layer,
    a protective third layer formed on said second layer and
    a second adhesive layer formed on said third layer, wherein said second layer is formed so as to be torn from the third layer, at the position in which said peeling agent layer is not formed on said first layer and satisfies the following formula:

a<c<b wherein the force required to separate the first layer from the first adhesion layer at the position in which the peeling agent layer is formed is represented by (a), the adhesive force of the second adhesive layer when adhered to a material to be labeled is represented by (b) and the force required to tear the second layer is represented by (c),
    said protective third layer protecting the second adhesive layer from being exposed when the second layer has been torn from the third layer.

3. The label in accordance with claim 1 or 2, wherein said first layer comprises a synthetic film.

4. The label in accordance with claim 3, wherein said first layer comprises a polyester film.

5. The label in accordance with claims 1 or 2, wherein said first layer comprises paper.

6. The label in accordance with claims 1 or 2, wherein said first layer comprises a printed layer formed on the main surface thereof.

7. The label in accordance with claims 1 or 2, wherein said second layer comprises a metal layer.

8. The label in accordance with claim 7, wherein said metal layer comprises a metal foil.

9. The label in accordance with claim 8, wherein said second layer comprises a layer formed by laminating aluminum foils.

10. The label in accordance with claim 7, wherein said metal layer comprises a synthetic resin layer mixed with metal powder.

11. The label in accordance with claim 10, wherein said second layer comprises a colored resin layer.

12. The label in accordance with claims 1 or 2, which further comprises a printed layer formed on one main surface of said second layer.

13. The label in accordance with claims 1 or 2, which further comprises a layer formed with one main surface of said second layer being colored.

14. The label in accordance with claims 1 or 2, wherein said second layer comprises a breakable synthetic resin film.

15. The label in accordance with claims 1 or 2, wherein said first adhesion layer is coated with wax.

16. The label in accordance with claims 1 or 2, wherein said first adhesion layer comprises a layer coated with paraffin.

17. The label in accordance with claims 1 or 2, wherein said first adhesion layer comprises a resin layer coated with a synthetic resin.

18. The label in accordance with claim 17, wherein said resin layer comprises a resin layer coated with a urethane resin.

19. The label in accordance with claim 20, wherein said resin layer comprises a resin layer coated with an EVA resin.

20. The label in accordance with claims 1 or 2, wherein said second adhesion layer comprises an adhesion layer coated with adhesives.

21. The label in accordance with claim 20, wherein said second adhesion layer comprises an adhesive layer coated with urethane group adhesives.

22. The label in accordance with claim 20, wherein said second adhesion layer comprises an adhesive layer coated with polyester group adhesives.

23. The label in accordance with claims 1 or 2, wherein said peeling agent layer comprises a layer coated with a silicon resin.

24. The label. in accordance with claim 23, wherein said peeling agent layer forms picture lines.

25. The label in accordance with claim 1, wherein said protective third layer comprises a resin layer coated with a synthetic resin.

26. The label in accordance with claim 1, which comprises a printed layer formed on one main surface of said protective third layer.

27. The label in accordance with claim 1, wherein said protective third layer comprises a colored resin layer.

28. The label in accordance with claims 1 or 2, wherein said second adhesive layer is adhered temporarily with a release sheet on one main surface thereof.

* * * * *